US008356831B2

(12) United States Patent
Pollock et al.

(10) Patent No.: US 8,356,831 B2
(45) Date of Patent: Jan. 22, 2013

(54) ADJUSTABLE TRAILER HITCH

(75) Inventors: Michael John Pollock, Boswell, PA (US); John E. Gover, Jr., New Florence, PA (US); Brian S. Rose, Windber, PA (US); Greg E. Holt, Markleton, PA (US)

(73) Assignee: Concurrent Technologies Corporation, Johnstown, PA (US)

( * ) Notice: Subject to any disclaimer, the term of this patent is extended or adjusted under 35 U.S.C. 154(b) by 581 days.

(21) Appl. No.: 12/505,834

(22) Filed: Jul. 20, 2009

(65) Prior Publication Data

US 2010/0013189 A1 Jan. 21, 2010

Related U.S. Application Data

(60) Provisional application No. 61/081,957, filed on Jul. 18, 2008.

(51) Int. Cl.
*B60D 1/46* (2006.01)
(52) U.S. Cl. .................................. 280/479.3; 280/490.1
(58) Field of Classification Search ............... 280/479.3, 280/490.1, 491.1, 515
See application file for complete search history.

(56) References Cited

U.S. PATENT DOCUMENTS

| | | | | | |
|---|---|---|---|---|---|
| 3,281,162 | A | * | 10/1966 | Carson | 280/479.3 |
| 3,612,576 | A | * | 10/1971 | Marler | 280/479.3 |
| 4,116,460 | A | * | 9/1978 | Drower | 280/478.1 |
| 7,219,915 | B2 | * | 5/2007 | Christensen | 280/490.1 |
| 7,441,793 | B1 | * | 10/2008 | Lim | 280/504 |
| 2003/0052472 | A1 | * | 3/2003 | Moss et al. | 280/415.1 |
| 2006/0249926 | A1 | * | 11/2006 | Smith | 280/491.1 |
| 2007/0001425 | A1 | * | 1/2007 | Helms et al. | 280/456.1 |

OTHER PUBLICATIONS

Williams Easy Hitch, Inc., Product Brochure, 12 pages (see in particular pp. 3-5)—Admitted Prior Art.

* cited by examiner

*Primary Examiner* — Tony Winner
(74) *Attorney, Agent, or Firm* — Buchanan Ingersoll & Rooney PC

(57) ABSTRACT

The adjustable trailer hitch assembly of the present invention is designed for attachment to the head of most commercially available trailers. The adjustable trailer hitch assembly includes a first weldment member pivotally attachable to a head of a trailer, and a second weldment member operably connected to the first weldment member for lateral movement between extended and locked positions. Collapsible extension arms operably connect the first and second weldment members providing movement between the extended and locked positions. The collapsible extension arms are positionable between a first collapsed position with the first and second weldment members adjacent one another defining the locked position, and a second extended position with the first and second weldment members separated from one another defining the extended position. A vehicle connection element is operably connected to the second member, with the vehicle connection element moveable along a vertical length of the second member for connection to a tow vehicle.

20 Claims, 12 Drawing Sheets

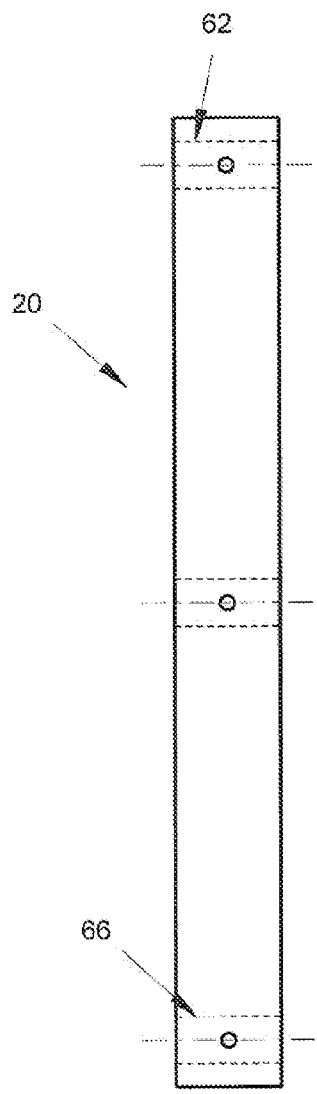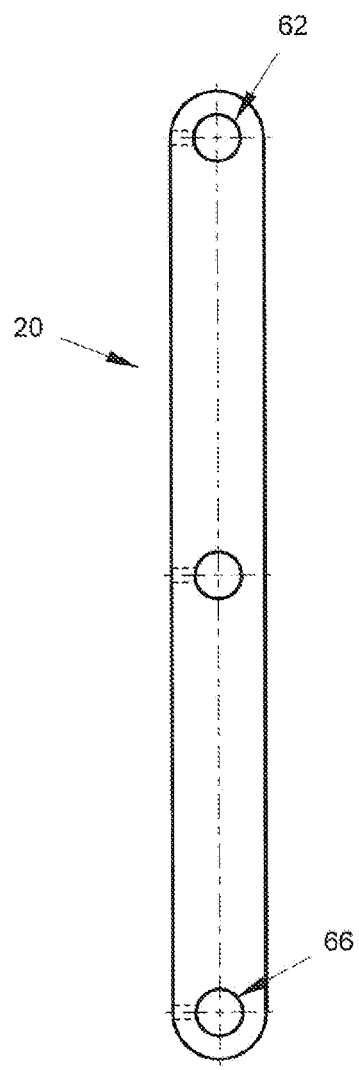
FIG. 8A
FIG. 8B

ADJUSTABLE TRAILER HITCH

CROSS REFERENCE TO RELATED APPLICATIONS

This application claims the benefit of Provisional Patent Application Ser. No. 61/081,957 entitled "Adjustable Trailer Lunette", filed on Jul. 18, 2008, the entire disclosure of which is incorporated by reference herein.

FIELD OF THE INVENTION

The present invention is directed toward hitches and other connection apparatus for use on equipment such as trailers and, more particularly, toward a trailer hitch assembly which provides for hitch adjustability in the vertical, lateral and fore/aft directions allowing for quick and efficient connection to a tow vehicle in a variety of rough and uneven terrains.

BACKGROUND OF THE INVENTION

Trailers and hitches are well-known in the prior art. Trailers may be utilized to haul various types of vehicles, equipment and cargo. Trailers may take virtually any configuration depending upon the type of vehicle, equipment, cargo, etc. they are designed to transport. A hitch assembly and an element for connection to a vehicle are typically attached to the trailer for connection to a tow vehicle. A lunette ring is a type of trailer hitch that works in connection with a pintle hook on the tow vehicle. Another type of trailer hitch is a tow-hall type hitch which utilizes a tow-ball attached to the vehicle which engages a tongue on the trailer.

Typical trailers will include a frame for supporting the item(s) to be transported and a chassis supporting the frame. An axle is provided beneath the chassis for wheels which contact a road surface. A hitch assembly including a vehicle connection element (lunette ring, tongue, etc) is provided at the head of the trailer frame for connection to a vehicle. Trailers also typically have a jack connected to the frame to support the hitch assembly during hitching and unhitching to a vehicle.

When attaching a trailer to a tow vehicle, a problem that often arises is that the tow vehicle cannot be placed close enough to the trailer to allow connection of the trailer to the tow vehicle. Such a problem often arises in uneven and/or rough terrain where optimal placement of the tow vehicle with respect to the trailer simply cannot be accomplished. If the trailer is supporting a heavy load that cannot be moved manually, trailer hook up to the tow vehicle can become very time consuming and burdensome, and in certain instances may simply not be possible.

Additionally, and as can be appreciated, in a military environment it is often imperative to provide quick and efficient hook up of a trailer to a tow vehicle. In a hostile environment, the longer such a connection process takes and the more individuals who are required to effectuate it, the more dangerous the situation can become.

The present invention is directed toward overcoming one or more of the above-mentioned problems.

SUMMARY OF THE INVENTION

The adjustable trailer hitch assembly of the present invention is designed for attachment to the head of most commercially available trailers. The inventive adjustable trailer assembly includes a first weldment member pivotally attachable to a head of a trailer, and a second weldment member operably connected to the first weldment member for lateral movement between extended and locked positions. Collapsible extension arms operably connect the first and second weldment members providing movement between the extended and locked positions. The collapsible extension arms are positionable between a first collapsed position with the first and second weldment members adjacent one another defining the locked position, and a second extended position with the first and second weldment members separated from one another defining the extended position. A vehicle connection element is operably connected to the second member, with the vehicle connection element moveable along a vertical length of the second member for connection to a tow vehicle.

In one form, the vehicle connection element includes a lunette ring attachable to a pintle hook on a tow vehicle.

In another form, the first weldment, the second weldment member, the vehicle connection element and the collapsible extension arms are made of high strength steel.

Locking pins are provided on the first weldment member for both locking the trailer hitch assembly in a center-aligned position securing it from pivoting, and also to lock the second weldment member in a locked position. The locking pins are spring biased and actuatable by a user for disengagement to allow the trailer hitch assembly to pivot and the second weldment member to extend simultaneously. Such a design provides hitch adjustability in the vertical, lateral and fore/aft directions that has previously not been obtainable with prior art designs.

Some advantages of the inventive adjustable trailer hitch assembly include, but are not limited to:

Rotating pins and bushings are less susceptible to freeze-ups from dirt and debris enabling the assembly to have an extended service life.

Lateral movement of the assembly can occur without requiring extension.

The assembly can be integrated by welding to trailer chassis, which allows designers to easily incorporate the assembly into their designs.

The inventive assembly will not catastrophically fail while extended should the locking pin operation not be executed.

The inventive assembly auto-latches into the tow position.

The inventive assembly is scalable to meet various trailer sizes and specifications.

Lunette rings, ball hitches and other types of vehicle connection elements may be used with the inventive adjustable trailer hitch assembly.

It is an object of the present invention to provide an adjustable trailer hitch assembly capable of adjustability in the vertical, lateral and fore/aft directions allowing for quick and efficient connection to a tow vehicle in a variety of rough and uneven terrains. As long as the driver of the tow vehicle gets the tow connection element on the vehicle within a certain minimum distance of the corresponding tow connection element on the hitch assembly, the inventive assembly permits quick and easy hook-up to the tow vehicle.

It is a further object of the present invention to provide an adjustable trailer hitch assembly which provides failsafe operation in the event the locking pins do not engage.

It is yet a further object of the present invention to provide an adjustable trailer hitch assembly that can be easily integrated into a variety of types of trailers, including, tactical military trailers, commercial and residential hauling trailers, military and commercial boat trailers, farm implements, etc.

Other objects, aspects and advantages of the present invention can be obtained from a study of the specification, the drawings, and the appended claims.

BRIEF DESCRIPTION OF THE DRAWINGS

FIGS. 8a-b are top and front views, respectively, of a second extension arm of the inventive adjustable trailer hitch assembly;

DETAILED DESCRIPTION OF THE INVENTION

Figure 1:
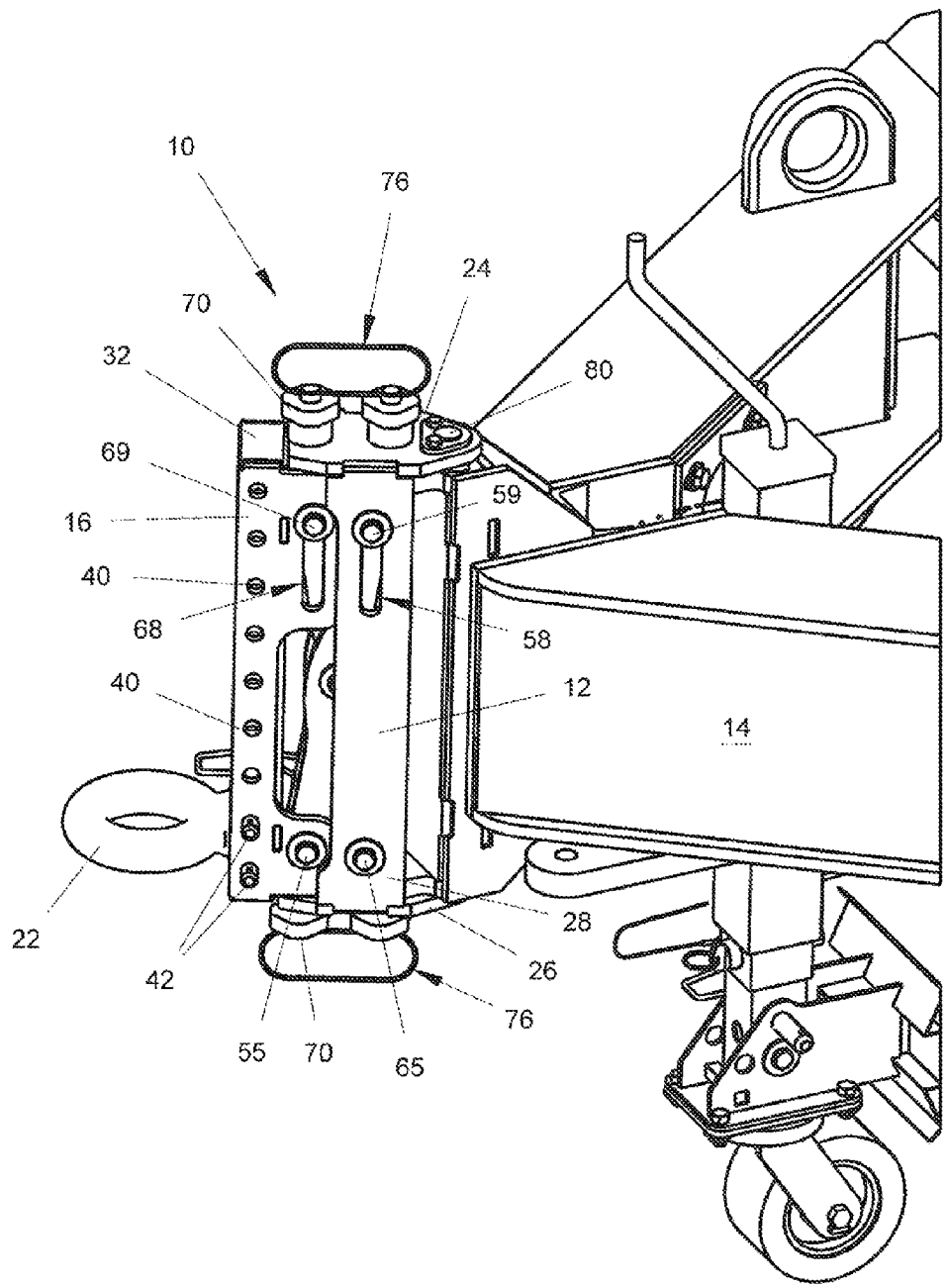
FIG. 1 is a perspective view of the of the inventive adjustable trailer hitch assembly connected to a trailer, with the inventive assembly in a locked position.

As shown in FIGS. 1-4, the adjustable trailer hitch assembly of the present invention, shown generally at 10, includes a first weldment member 12 pivotally attached to a trailer 14, and a second weldment member 16 moveably attached to the first member 12 via extension arms 18 and 20. A lunette ring 22 connected to the second member 16, the lunette ring 22 being attachable to a pintle hook included on a tow vehicle (not shown). A lunette ring is simply one of numerous vehicle connection elements that can be used with the present invention and is shown in the drawings for exemplary purposes only to facilitate an understanding of the invention. The present invention is not limited to the use of lunette rings.

Figure 5:
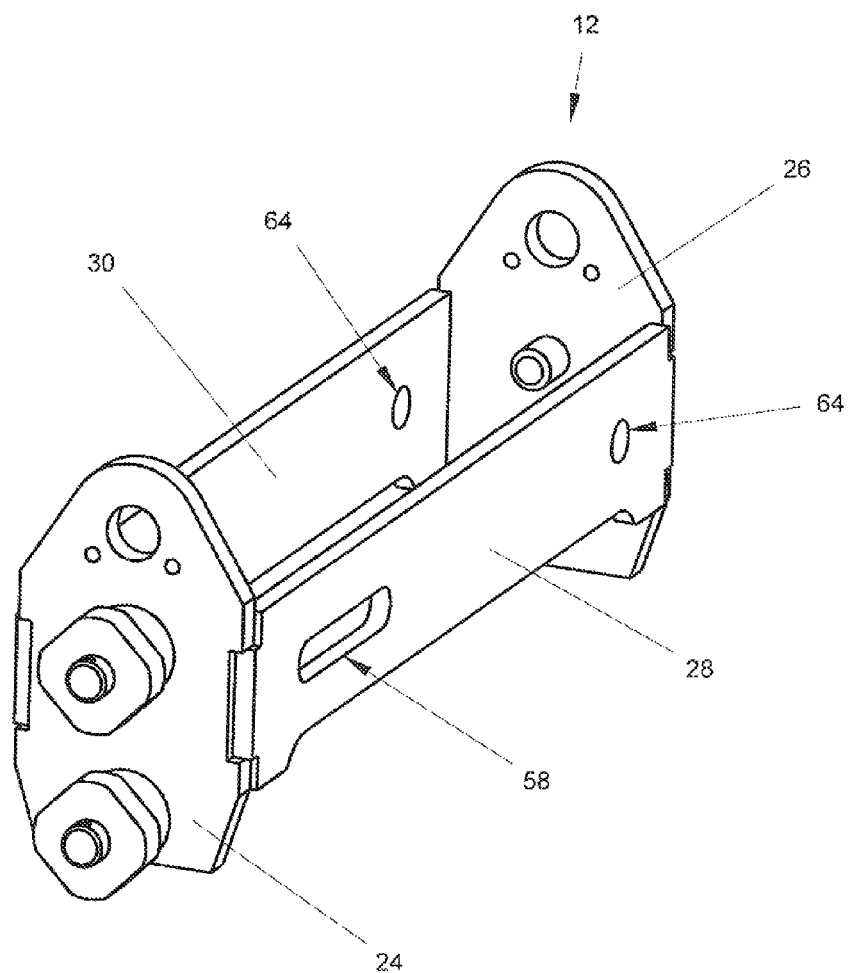
FIG. 5 is a perspective view of a first weldment member of the inventive adjustable trailer hitch assembly.
Figure 6:
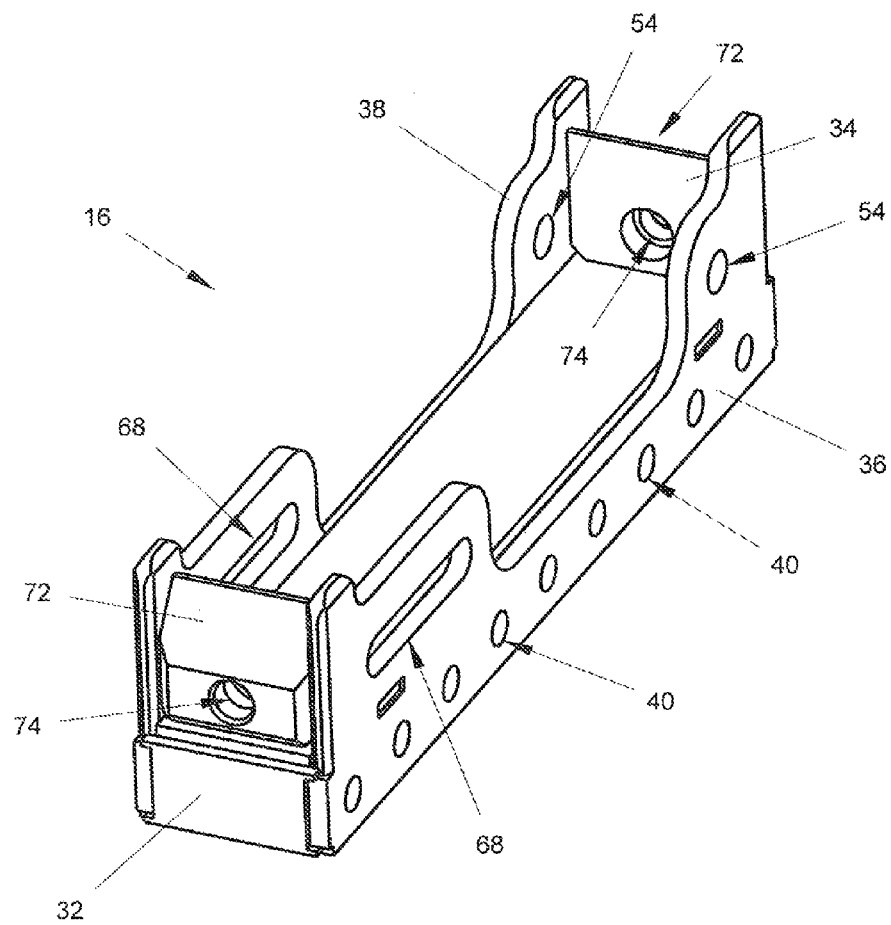
FIG. 6 is a perspective view of a second weldment member of the inventive adjustable trailer hitch assembly.

The first member 12 includes a top plate 24, a bottom plate 26, and side plates 28 and 30 connecting the top 24 and bottom 26 plates (see also FIG. 5). The plates are attached to one another using conventional welding techniques. Similarly, the second member 16 includes a top plate 32, a bottom plate 34, and side plates 36 and 38 connecting the top 30 and bottom 32 plates (see also FIG. 6). The plates are attached to one another using conventional welding techniques.

The second member 16 includes a plurality of vertically spaced apertures 40 formed in the side plates 36, 38 thereof. The lunette ring 22 may be aligned at any vertical point along the length of the second member 16 by aligning apertures formed in the lunette ring 22 with desired apertures 40 formed in the second member 16 and inserting one or more locking pins 42 there through.

Figures 7A, 7B:
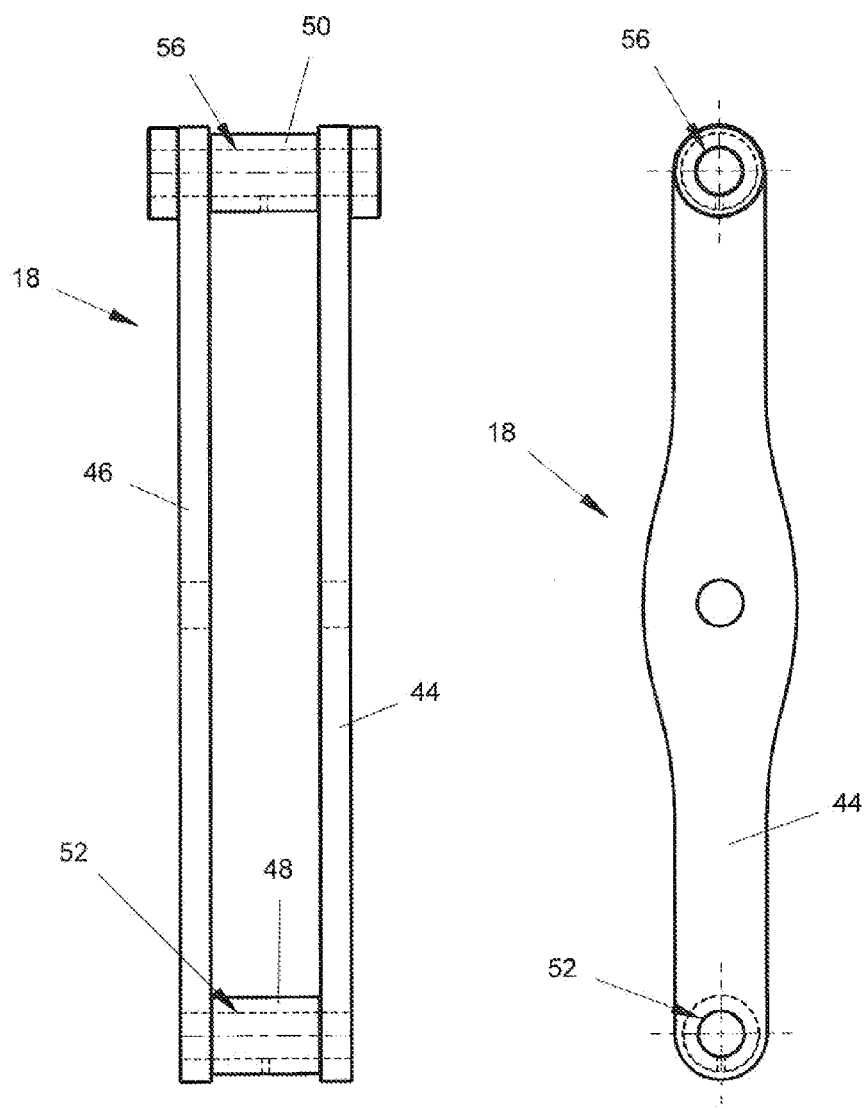
FIGS. 7a-b are top and front views, respectively, of a first extension arm of the inventive adjustable trailer hitch assembly.

Extension of the second member 16 from the first member 12 is accomplished by the extension arms 18, 20 as follows. Extension arm 18 includes side plates 44, 46 connected at either end by pins 48 and 50 (see also FIGS. 7a-b). Pin 48, as well as side plates 44, 46, includes an aperture 52 there though which is aligned with a corresponding aperture 54 formed in the side plates 36, 38 of the second member 16 and attached via a conventional locking pin 55 extending there through to provide a fixed pivoting connection point. Pin 50, as well as side plates 44, 46, includes an aperture 56 there through which is aligned with a channel 58 formed in the side plates 28, 30 of the first member 12 and attached via a convention locking pin 59 extending there through to provide a pivoting connection point moveable along the length of the channel 58.

Extension arm 20 is a unitary member which is provided between the side plates 44 and 46 of extension arm 18. Extension arms 18 and 20 are pivotally connected together, for example, at their midpoints by a pin 60 extending through apertures formed therein. One end of the extension arm 20 includes an aperture 62 there through which is aligned with a corresponding aperture 64 formed in the side plates 28, 30 of the first member 12 and attached via a conventional locking pin 65 extending there through to provide a fixed pivoting connection point. The other end of the extension arm 20 includes an aperture 66 there through which is aligned with a channel 68 formed in the side plates 36, 38 of the second member 16 and attached via a convention locking pin 69 extending there through to provide a pivoting connection point moveable along the length of the channel 68.

Figure 2:
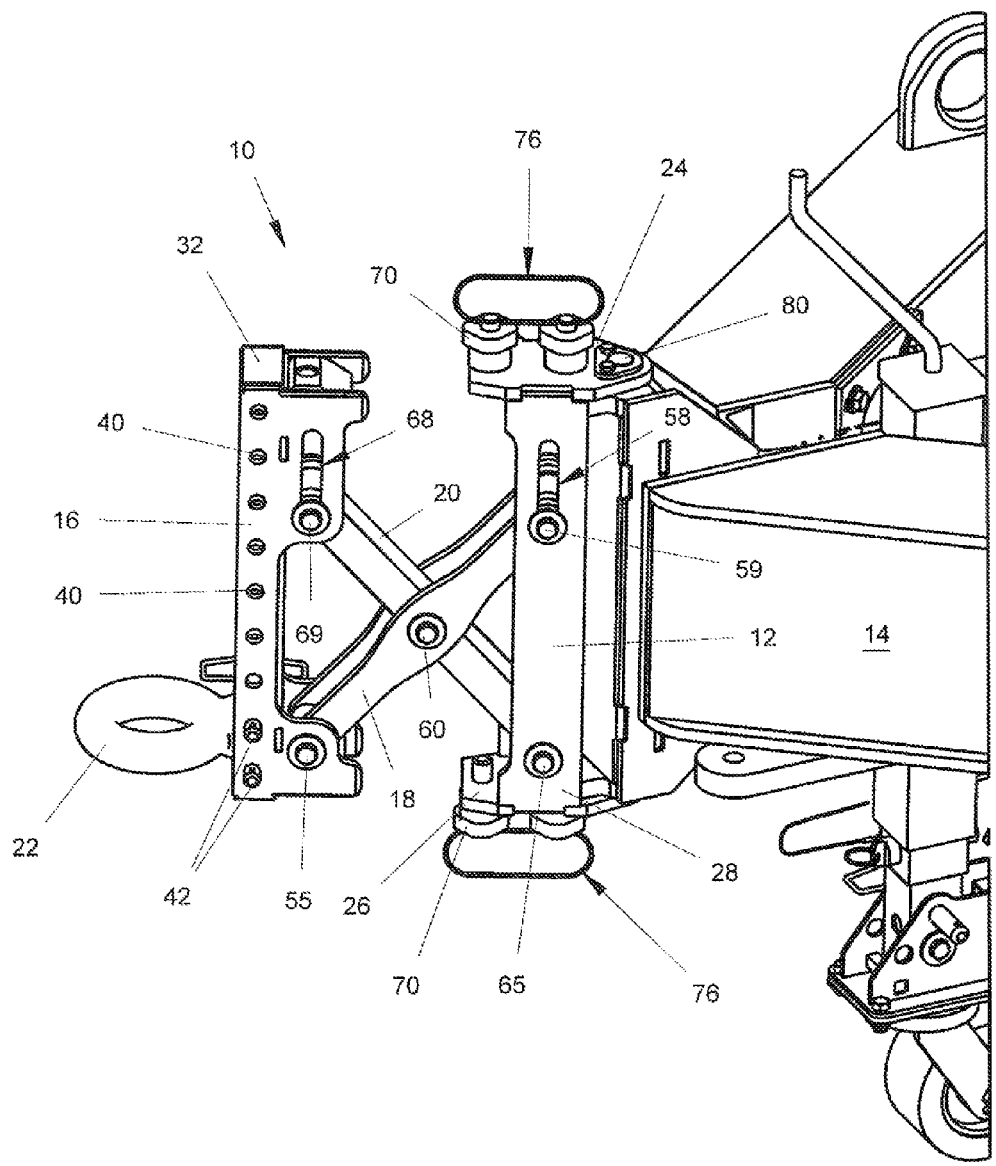
FIG. 2 is a perspective view of the of the inventive adjustable trailer hitch assembly connected to a trailer, with the inventive assembly in an extended position.

With the first 12 and second 16 members in a first locked position, as shown in FIG. 1, the pins 59 and 69 will be located at the top portions of the channels 58 and 68, respectively. When the second member 16 is moved to an extended second position, as shown in FIG. 2, the pins 59 and 69 will move along the respective channels 58 and 68 to allow for such extension. The bottoms of the channels 58 and 68 will stop movement of the pins 59 and 69, respectively, and provide for a maximum extension point. In this manner, the trailer hitch assembly 10 of the present invention may be extended to various lateral extended positions to accommodate the pintle hook (or other connection element) on the tow vehicle. This is particularly desirable in rough terrains where the tow vehicle cannot be moved to a position directly adjacent the trailer. By adjusting the vertical position of the lunette ring 22 along the length of the second member 16, deviations in the height of the terrain may also be accommodated. Thus, the inventive trailer hitch assembly 10 provides for a wide adjustment range for attaching the trailer to the tow vehicle. It should be noted that while the channels 58 and 68 are illustrating in the drawings as adjacent the tops plates 24 and 32 of the first 12 and second 16 members, respectively, one skilled in the art will appreciate that the channels 58 and 68 could also be provided adjacent the bottom plates 26 and 34 of the first 12 and second 16 members, respectively, without departing from the spirit and scope of the present invention.

Figure 9:
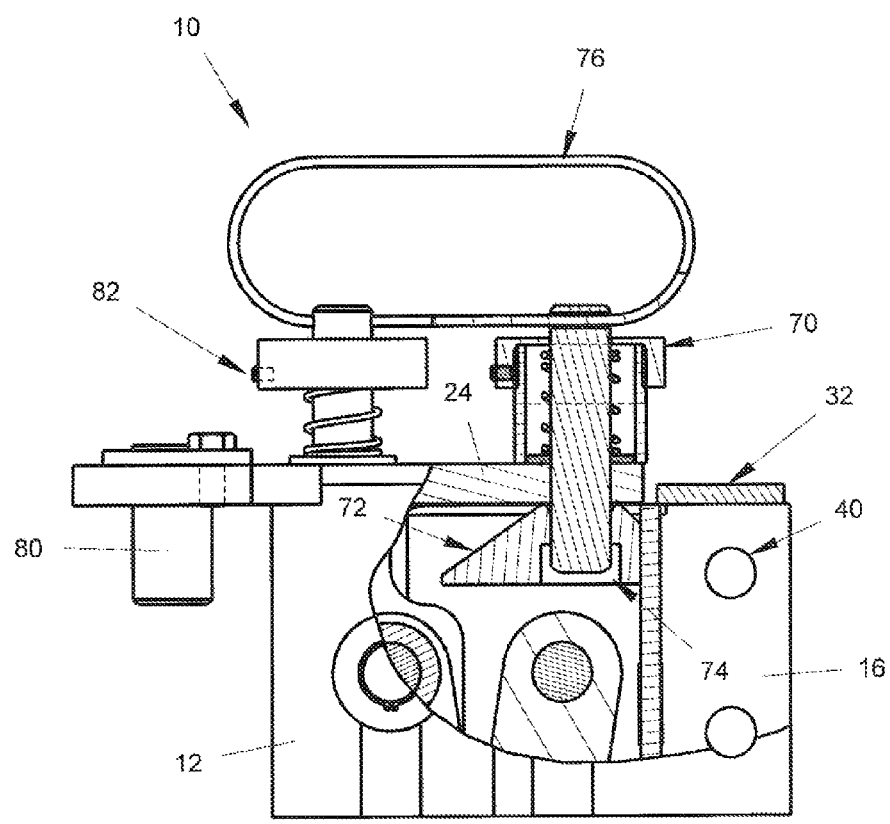
FIG. 9 is a partial cut-out cross-sectional view of the inventive adjustable trailer hitch assembly in a locked position preventing extension.

The trailer hitch assembly 10 of the present invention is maintained in a first locked position by spring loaded locking pins 70 extending through apertures formed in the top 24 and bottom 26 plates of the first member 12. The locking pins 70 are attached to the top 24 and bottom 26 plates of the first member 12 and are biased in a locked position as shown, for example, in FIG. 9. The top 32 and bottom 34 plates of the second member 16 include ramped surfaces 72 provided adjacent locking apertures 74. As the second member 16 is moved from an extended position to a locked position, the ramped surfaces 72 will engage the ends of the locking pins 70, pushing against the force of the spring and moving the pins 70 against their biased position as they move up the length of the ramped surfaces 72. Once the second member 16 is in a locked position, as shown in FIG. 9, the locking pins 70 will align with the locking apertures 74 and automatically extend there though via the force of the associated springs, thus locking the trailer hitch assembly 10 in the locked position.

Figure 4:
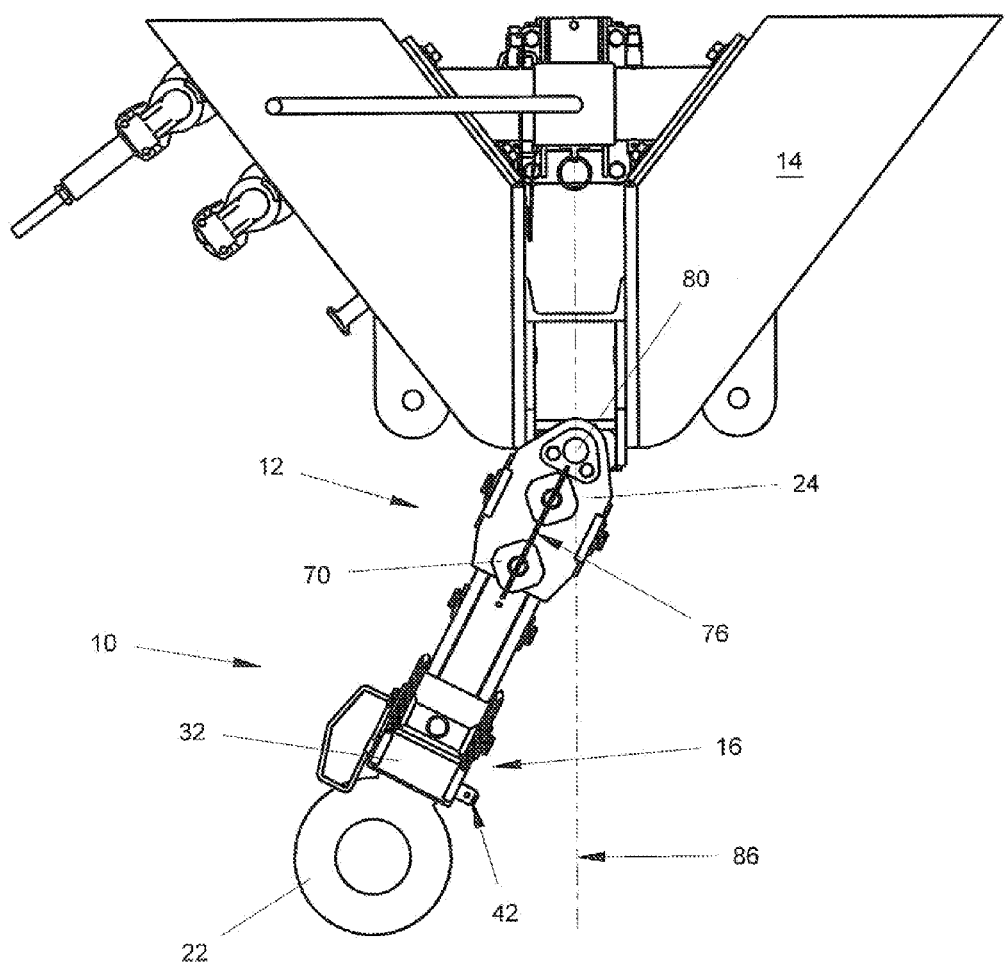
FIG. 4 is a top view of the of the inventive adjustable trailer hitch assembly connected to a trailer, with the inventive assembly in a pivoted and locked position.
Figure 10:
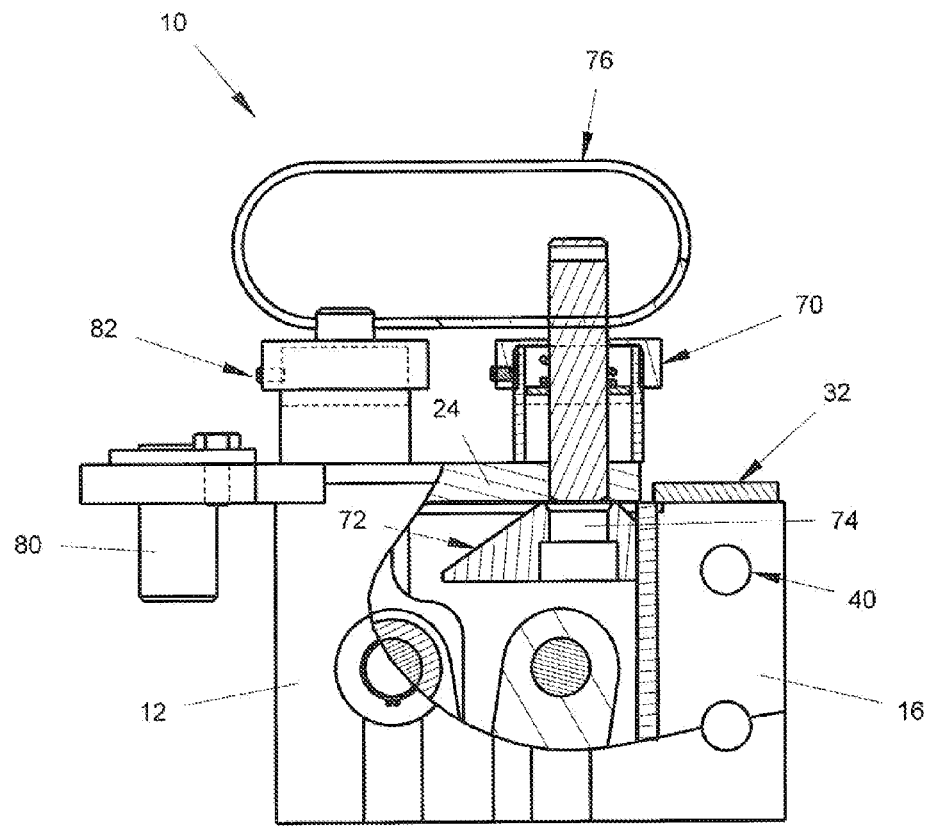
FIG. 10 is a partial cut-out cross-sectional view of the inventive adjustable trailer hitch assembly in an unlocked position permitting extension thereof.

Extension of the second member 16 is accomplished by a user grasping rings 76 extending through the locking pins 70. The rings 76 may be made of wire, rope, or other suitable material, and are provided for ease of use since both the top and bottom locking pins 70 must be disengaged before extension of the second member 16 can occur. In use, a user may place his/her foot in the bottom ring 76 and grasp the top ring 76 with his/her hand. Pulling the locking pins 70 against the force of the springs will disengage them from the locking aperture 74, as shown in FIG. 10, and allow the second member 16 to be extended from the first member 12, as shown in FIGS. 2 and 4.

Figure 11:
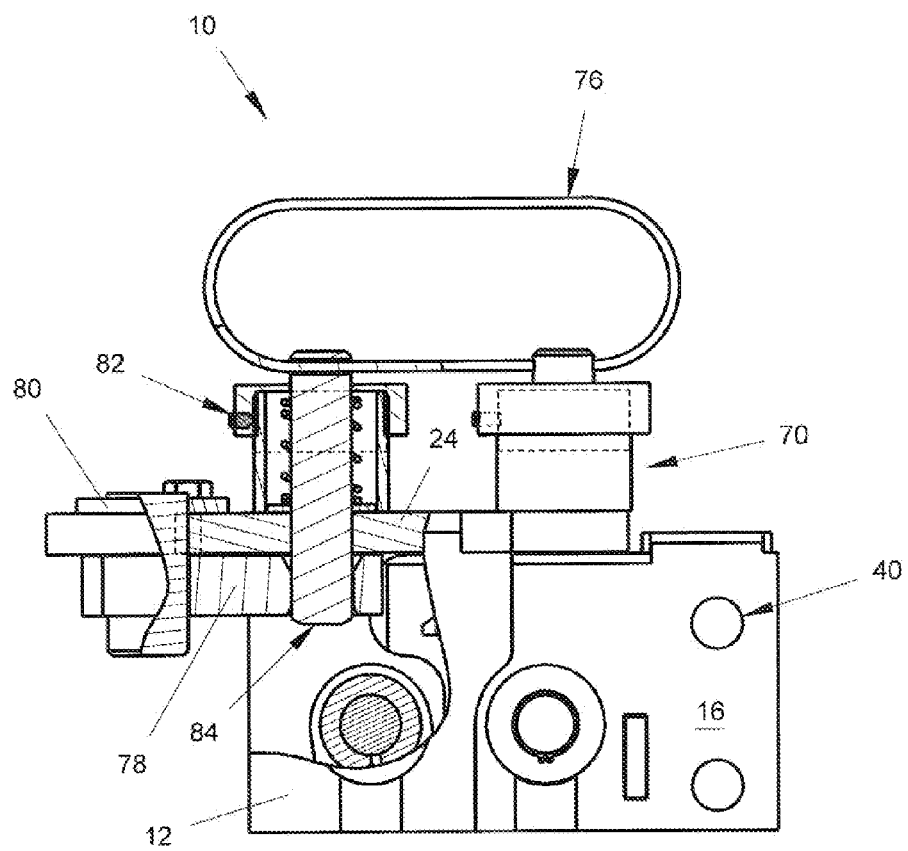
FIG. 11 is a partial cut-out cross-sectional view of the inventive adjustable trailer hitch assembly in a locked position preventing pivoting.

Pivotal attachment and movement of the trailer hitch assembly 10 is accomplished as follows. Typically, before assembly, a plate 78 will be welded to the top and bottom of the trailer 14. Swivel pins 80 are attached to, and extend through, the top 22 and bottom 24 plates of the first member 12, and also extend through the plates 78 to pivotally connect the trailer hitch assembly 10 to the trailer 14. Pivot locking pins 82 are provided in the top 24 and bottom 26 plates of the first member 12. The pins 82 extend through the top 24 and bottom 26 plates and also through corresponding apertures 84 formed in the welded plates 78. The pins 82 are biased to a locked position, as shown in FIG. 11, to prohibit pivoting of the trailer hitch assembly 10. Typically, the apertures 84 will be formed in the plates 78 at a location to lock the trailer hitch assembly 10 at a center position, as shown by dotted line 86 in FIGS. 3 and 4.

Figure 3:
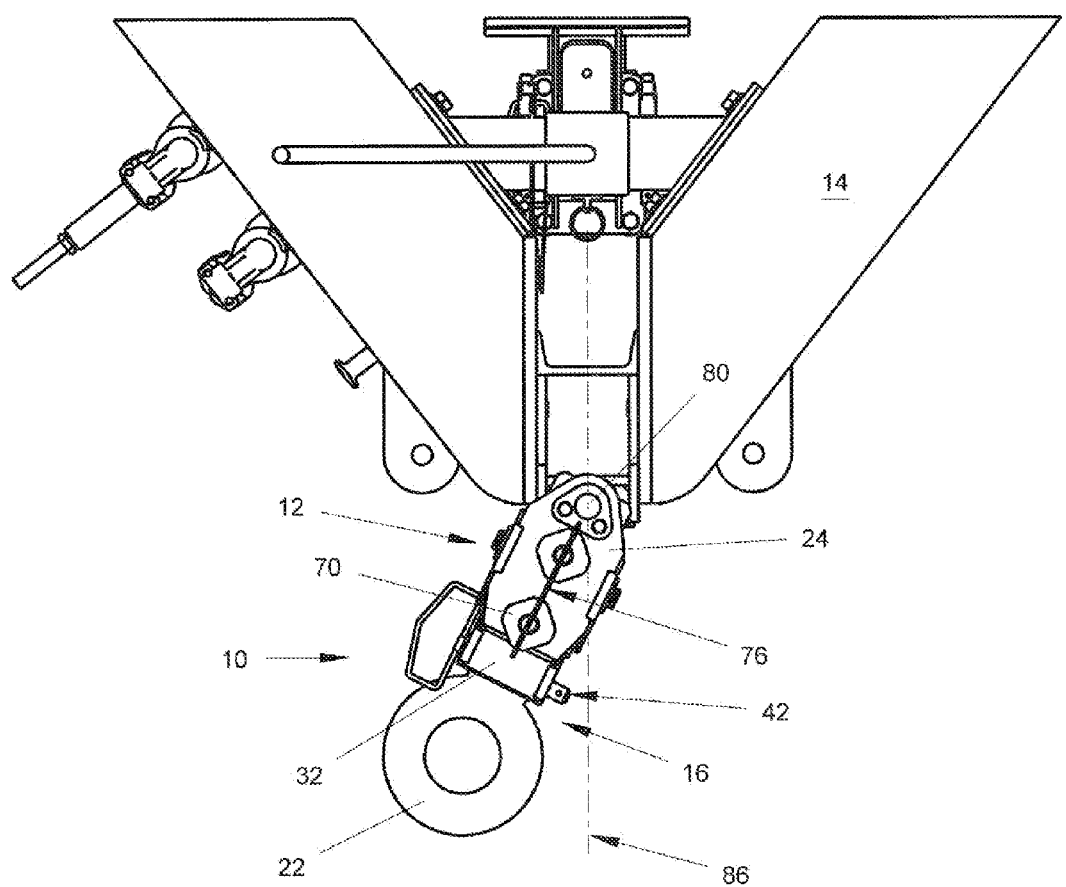
FIG. 3 is a top view of the of the inventive adjustable trailer hitch assembly connected to a trailer, with the inventive assembly in a pivoted and locked position.
Figure 12:
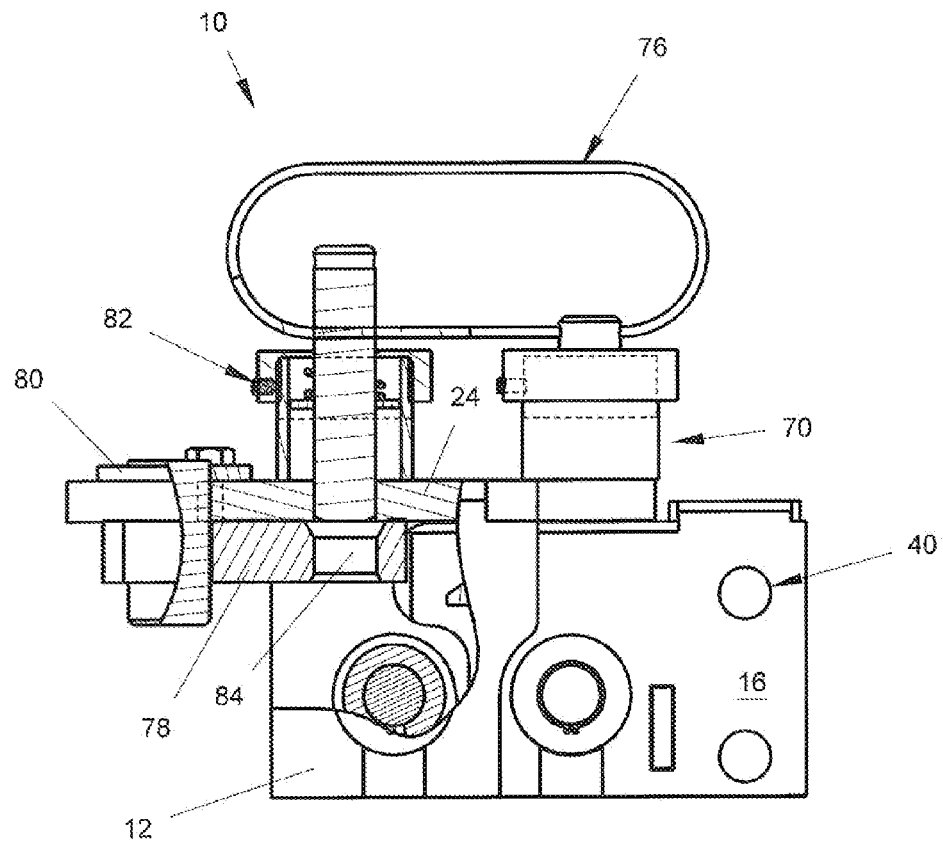
FIG. 12 is a partial cut-out cross-sectional view of the inventive adjustable trailer hitch assembly in an unlocked position permitting pivoting thereof.

Pivoting of the trailer hitch assembly 10 is accomplished by a user grasping the rings 76 that also extend through the locking pins 82. In use, a user may place his/her foot in the bottom ring 76 and grasp the top ring 76 with his/her hand. Pulling the locking pins 82 against the force of the springs will disengage them from the apertures 84, as shown in FIG. 12, and allow pivoting movement of the trailer hitch assembly 10 in either lateral direction, as shown in FIGS. 3 and 4. Pivoting of the trailer hitch assembly 10 can occur either when the second member 16 is in a locked position (see FIG. 3) or when the second member 16 is in an extended position (see FIG. 4). Pivoting movement in each lateral direction is limited by the associated side plate 28 or 30 of the first member 12 coming into contact with either the trailer 14 or the welded plate 78. Upon rotation back to the center position (see dotted line 86 in FIGS. 3-4), the pivot locking pin 82 will automatically be biased through the aperture 84 and lock the trailer hitch assembly 10 into its center-aligned position.

The adjustable trailer hitch assembly 10 of the present invention allows rapid hook-up of the trailer 14 to various vehicles in various types of terrain because the driver can be less precise in positioning the tow vehicle relative to the trailer 14. Additionally, only one individual, typically the driver, is required to attach the trailer 14 to the tow vehicle, which minimizes the need for an additional individual to direct the driver from the outside and keeps other individuals out of harm's way. The tow vehicle can be positioned at a point near the trailer 14, and the adjustable trailer hitch assembly 10 of the present invention can be adjusted in the vertical, lateral and fore/aft directions to connect the trailer 14 to the tow vehicle. In one embodiment, the tow vehicle connection element may be offset laterally up to 8.5-inches from the center line of the trailer 14, and up to 7-inches forward of the normal towing position. Additionally, 14-inches of vertical adjustment is typically provided to connect tow vehicles to with varying connection element heights. However, one skilled in the art will realize that these ranges of adjustability are exemplary only and various other ranges of adjustability may be implemented depending on the scalability of the assembly and the intended field of use and trailer capacity without departing from the spirit and scope of the present invention.

In operation, an operator would back the tow vehicle up to the trailer 14. The locking pins 42 on the lunette ring 22 would be removed to adjust the lunette ring 22 to the proper height to meet the height of the tow vehicle pintle hook. The extension 70 and pivoting 82 locking pins would then be released to allow the trailer hitch assembly 10 to swing (pivot) and extend. The lunette ring 22 is then positioned into the pintle hook of the tow vehicle. After connection of typical safety chains and electrical/air connections, the driver would then pull forward causing the trailer tongue to align and the pivot locking pin 82 to automatically lock in place. The tow vehicle could then be put in a reverse position and backed up for the extension arms 18 and 20 to collapse cause the extension pin 70 to automatically lock in place and secure the second member 16 to the locked position. The operator then could secure the safety latch with a padlock or linchpin to ensure that the main latch pins are secure. The trailer 14 is then ready for towing.

In an additional mode of operation, the operator would back the tow vehicle up to the trailer 14. The locking pins 42 on the lunette ring 22 would be removed to adjust the lunette ring 22 to the proper height to meet the height of the tow vehicle pintle hook. The extension 70 and pivoting 82 locking pins would then be released to allow the trailer hitch assembly 10 to swing (pivot) and extend. The lunette ring 22 is then positioned into the pintle hook of the tow vehicle. After connection of typical safety chains and electrical/air connections, the driver could then simply pull away without having to back the vehicle up to lock the trailer hitch assembly 10 to a locked position. As the driver moves away, pivoting of the trailer hitch assembly 10 to a center position would automatically cause the pivot locking pins 82 to engage the apertures 84 and lock the trailer hitch assembly 10 to its center-aligned position. As the vehicle moves forward and slows, the momentum of the trailer 14 would push it forward causing the extension arms 18 and 20 to collapse and the first 12 and second 16 members to be pushed together, so that the extension locking pins 70 would automatically engage the apertures 74 after riding up the ramped surfaces 72 and secure the second member 16 to its locked position. It is contemplated that all of the elements of the trailer hitch assembly 10 be made of a high strength steel so that the assembly 10 may be operational for towing in either locked or extended positions.

As one skilled in the art will appreciate, the inventive trailer hitch assembly 10 allows ease of operation to connect a trailer 14 to a tow vehicle. While the invention has been described herein as using a lunette ring 22 to connect the trailer 14 to the tow vehicle, this is for exemplary purposes only and is in no way meant to limit the scope of the present invention. Other types of vehicle connection elements including ball hitches, etc. may be implemented with the inventive assembly 10 depending upon the attachment mechanism used by the tow vehicle without departing from the spirit and scope of the present invention.

The inventive design offers a solution that is inherently not susceptible to operational failure due to sand and dirt infiltration. But utilizing rotating pins and keeping sliding surfaces to a minimum and vertically oriented, dirt entrapment points are reduced. The scissor design of the extension arms 18 and 20 allows a robust structure with a large vertical adjustment capability and rigidity when in the extended position, in addition to being stiff when in a jack-knifed position. The inventive design is scalable to meet the needs of various applications and can provided operational reliability, life expectancy and range of motion that meets or exceeds typical requirements.

While the present invention has been described with the particular reference to the drawings, it should be understood that various modifications could be made without departing from the spirit and scope of the present invention. For example, while a scissor design of the extension arms is described for extension of the assembly, one skilled in the art will understand that other types of apparatus may be implemented for such extension without departing from the spirit and scope of the present invention. Those skilled in the art will appreciate the various other modifications and alterations could be developed in light of the overall teachings of the disclosure. The presently preferred embodiments described herein are meant to be illustrative only and not limiting as to the scope of the invention which is to be given the full breadth of the appended claims and any and all equivalents thereof.

We claim:

1. A trailer hitch assembly for attachment to a trailer, the trailer hitch assembly comprising:
    a first member pivotally attachable to a head of the trailer;
    a second member operably connected to the first member, the second member moveable with respect to the first member between a first locked position with the first and second members adjacent one another and a second extended position with the second member extended from the first member; and
    a vehicle connection element operably connected to the second member, the vehicle connection element moveable along a vertical length of the second member for connection to a tow vehicle.

2. The trailer hitch assembly of claim 1, wherein the vehicle connection element comprises a lunette ring.

3. The trailer hitch assembly of claim 1, wherein the second member includes a plurality of apertures formed along its vertical length, and wherein the vehicle connection element is connectable to the second member at any of the plurality of apertures to provide for vertical height adjustment.

4. The trailer hitch assembly of claim 1, further comprising first and second extension arms movably connecting the second member to the first member, the first extension arm having a first end pivotally connected to the first member and a second end pivotally connected to the second member and movable along a channel formed in the second member, and the second arm having a first end pivotally connected to the second member and a second end pivotally connected to the first member and movable along a channel formed in the first member.

5. The trailer hitch assembly of claim 4, wherein the first and second extension arms are pivotally connected to each other at their respective midpoints.

6. The trailer hitch assembly of claim 4, wherein the first member, the second member, the vehicle connection element and the first and second extension arms are all made of high strength steel.

7. The trailer hitch assembly of claim 1, wherein the first and second members each include an aperture formed therein, wherein with the apertures aligned the first and second members are in the first locked position and secured in place with a spring loaded locking pin provided on the first member.

8. The trailer hitch assembly of claim 7, wherein the second member includes a ramped surface adjacent the aperture formed therein, the ramped surface engaging the spring loaded locking pin on the first member as the second member is moved from the second extended position to the first locked position.

9. The trailer hitch assembly of claim 1, wherein the first member includes a spring loaded locking pin extendable through a corresponding aperture formed in the trailer to lock the trailer hitch assembly from pivoting movement.

10. A trailer hitch assembly for attachment to a trailer, the trailer hitch assembly comprising:
    a first member pivotally attachable to a head of a trailer;
    a second member;
    collapsible extension arms operably connecting the first and second members, the collapsible extension arms positionable between a first collapsed position with the first and second members adjacent one another and a second extended position with the first and second members separated from one another; and
    a vehicle connection element operably connected to the second member, the vehicle connection element moveable along a vertical length of the second member for connection to a tow vehicle.

11. The trailer hitch assembly of claim 10, wherein the vehicle connection element comprises a lunette ring.

12. The trailer hitch assembly of claim 10, wherein the first member, the second member, the vehicle connection element and the collapsible extension arms are all made of high strength steel.

13. The trailer hitch assembly of claim 10,
    wherein the first member includes top and bottom plates and side plates connecting the top and bottom plates, the first member pivotally connected to the trailer via connection pins extending through the top and bottom plates of the first member, and
    wherein the second member includes top and bottom plates and side plates connecting the top and bottom plates.

14. The trailer hitch assembly of claim 13, wherein the side plates of the second member include a plurality of apertures formed along its vertical length, and wherein the vehicle connection element is connectable to the second member at any of the plurality of apertures to provide for vertical height adjustment.

15. The trailer hitch assembly of claim 13, wherein the collapsible extension arms comprise:
    a first arm having a first end pivotally connected to the side plates of the first member and a second end pivotally connected to the side plates of the second member and moveable along a channel formed in the side plates of the second member; and
    a second arm having a first end pivotally connected to the side plates of the second member and a second end pivotally connected to the side plates of the first member and moveable along a channel formed in the side plates of the first member.

16. The trailer hitch assembly of claim 15, where the first and second arms are pivotally connected to each other at their respective midpoints.

17. The trailer hitch assembly of claim 13, wherein the top and bottom plates of the first and second members include apertures formed therein, wherein with the apertures aligned the first and second members are secured from extension via locking pins extending through the apertures.

18. The trailer hitch assembly of claim 17, wherein the locking pins comprise spring loaded locking pins provided on the top and bottom plates of the first member.

19. The trailer hitch assembly of claim 18, wherein the top and bottom plates of the second member include a ramped surfaces adjacent the apertures formed therein, the ramped surfaces engaging the spring loaded locking pins on the top and bottom plates of the first member as the second member is moved toward to the first member.

20. The trailer hitch assembly of claim 13, wherein the top and bottom plates of the first member include spring loaded locking pins extendable through corresponding apertures formed in the trailer to lock the trailer hitch assembly from pivoting movement.

* * * * *